(No Model.)  2 Sheets—Sheet 1.

J. E. WELLING.
STEAM COOKING APPARATUS.

No. 275,302.  Patented Apr. 3, 1883.

WITNESSES:  
Fred. G. Dieterich.  
Wm. Lecher.

John E. Welling,  
INVENTOR.  
By Louis Bagger & Co.  
ATTORNEYS.

(No Model.) 2 Sheets—Sheet 2.

J. E. WELLING.
STEAM COOKING APPARATUS.

No. 275,302. Patented Apr. 3, 1883.

WITNESSES:
Fred. G. Dieterich.

John E. Welling
INVENTOR.
By Louis Bagger & Co.
ATTORNEYS

UNITED STATES PATENT OFFICE.

JOHN E. WELLING, OF GEORGETOWN, KENTUCKY.

STEAM COOKING APPARATUS.

SPECIFICATION forming part of Letters Patent No. 275,302, dated April 3, 1883.

Application filed January 31, 1883. (No model.)

*To all whom it may concern:*

Be it known that I, JOHN E. WELLING, of Georgetown, in the county of Scott and State of Kentucky, have invented certain new and useful Improvements in Steam Cooking Apparatus; and I do hereby declare that the following is a full, clear, and exact description of the invention, which will enable others skilled in the art to which it appertains to make and use the same, reference being had to the accompanying drawings, which form a part of this specification, and in which—

Figure 1:
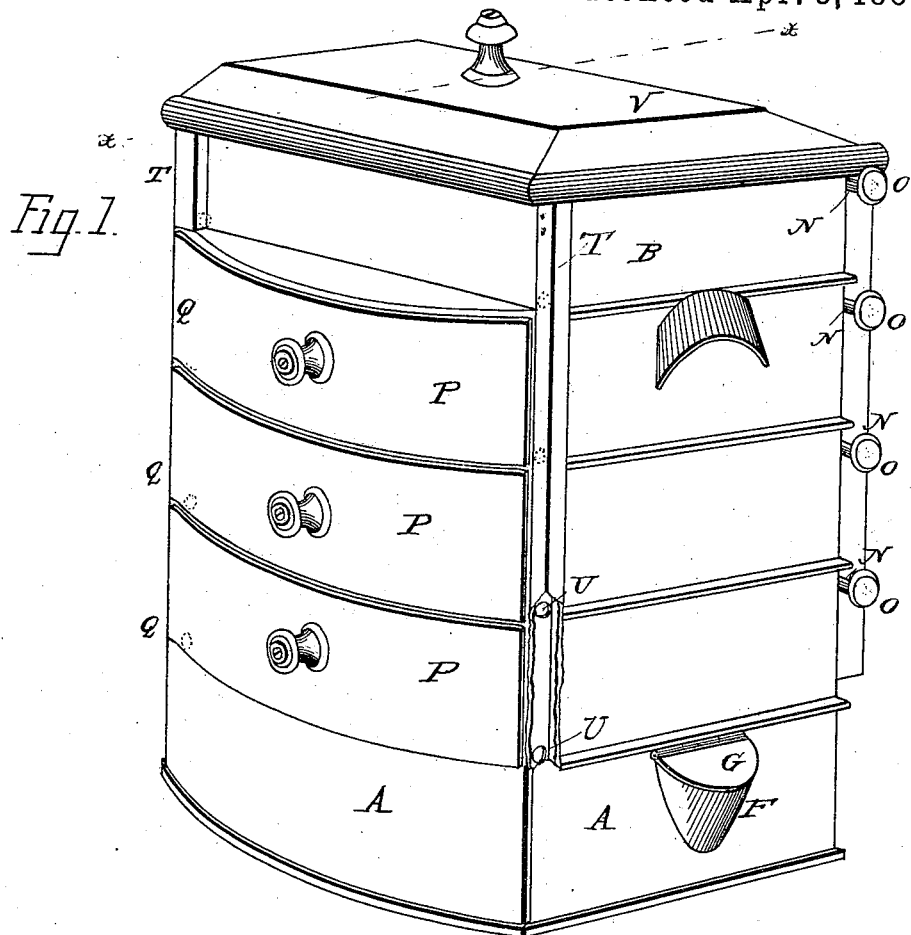
Figure 4:
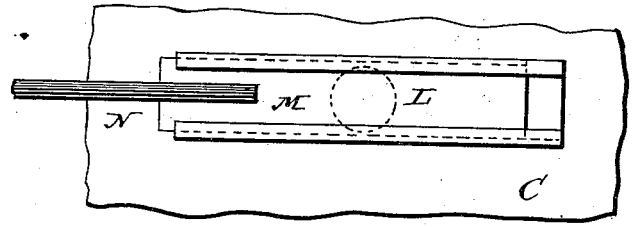
Figure 3:
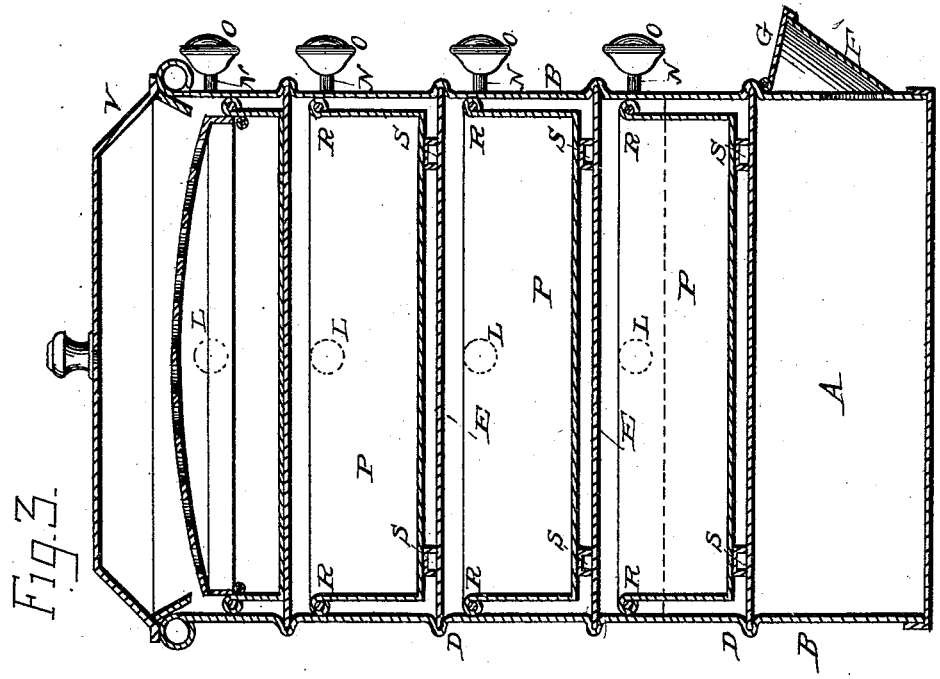
Figure 2:
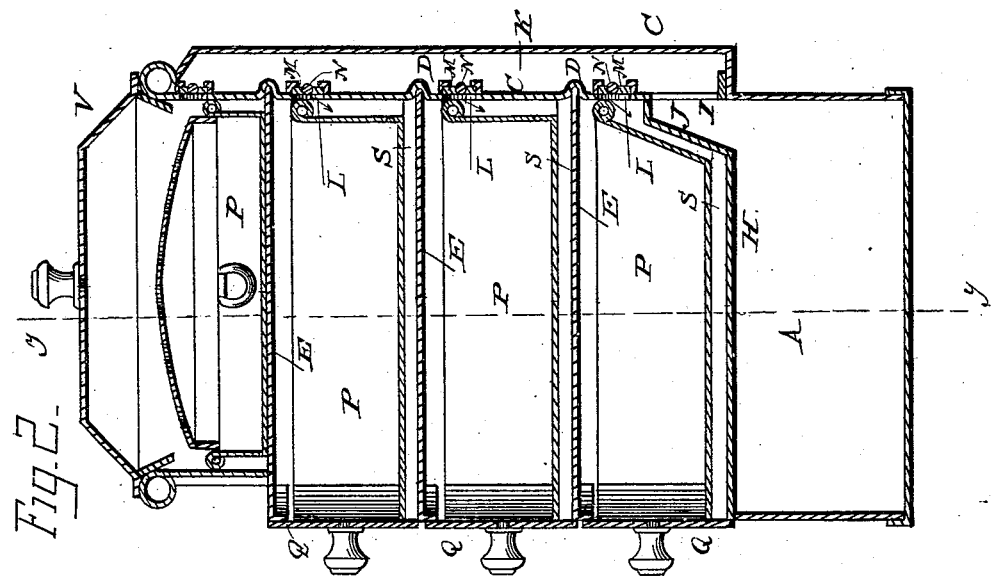

Figure 1 is a perspective view of my improved steam cooking apparatus. Fig. 2 is a vertical section on line $x\,x$, Fig. 1. Fig. 3 is a similar view on line $y\,y$, Fig. 2; and Fig. 4 is a detail view of the valves admitting steam to the several compartments.

Similar letters of reference indicate corresponding parts in all the figures.

My invention has relation to steam cooking apparatus; and it consists in the improved construction and combination of parts of an apparatus consisting of a boiler and compartments for cooking—one above the other—having means for admitting or cutting off the steam from each of the separate compartments, as hereinafter more fully described and claimed.

In the accompanying drawings, the letter A indicates the boiler, which is rectangular, with its front bulging slightly outward, the sides and back of which are extended upward, forming the closed sides B B and back C of the steam-chamber, the front of which is open for the insertion of drawers or pans for the articles to be cooked.

The apparatus is made of sheet metal, and the sides B and back C are folded or corrugated outward at equal distances, forming ways D, in which the edges of the horizontal partitions or separating-plates are inserted and held fast, the sides of said folds or corrugations clamping them firmly and holding them in place without the use of solder or any other fastening material.

The boiler is provided at one side with a funnel, F, through which it may be filled, and which is provided with a close-fitting hinged cover, G, which prevents the steam from escaping, but will open by any undue pressure, acting as a safety-valve.

The lower partition, H, which covers the boiler, is cut off a short distance from the rear side, C, of the steam-chamber, which has a slot, I, of a corresponding length, and the two openings thus formed are connected and closed off from the inside of the steam-chamber by an inclined plate, J. The slot I leads out into a steam channel or duct, K, which extends the whole height of the apparatus, and opens into each compartment through an opening, L, having a sliding shutter, M, operated from the outside by a rod, N, extending out to one side, and sliding in bearings, and provided with a knob or handle, O, at its outer end.

Drawers or pans P slide in the compartments formed by the partitions, and serve to hold the several articles to be cooked. The front sides, Q, of these drawers are provided with flanges, which bear against the front side of the steam-chamber, so as to close steam-tight upon the same, and the other three sides are beaded over wires or rods, forming outward-projecting flanges R, which bear against the inside of the compartment and form a steam-space around the drawer.

To admit of the steam passing under the drawers the upper surfaces of the partitions are provided with knobs or ledges S, which raise the bottom of the drawers and form a space under them.

Two channels or tubes, T, pass from the top of the apparatus on both sides of the front, and connect with the several compartments through small holes U in their sides, which allow the condensed steam to drain out of the compartments. The upper compartment is open at the top, and a pan of the usual construction may be placed in the same, that compartment being preferably intended for meats and such articles of food, and is supplied with steam in the same manner as the others, and covered by a steam-tight cover, V.

All the several drawers and pans may be provided with covers, if it is desired, to exclude the steam from coming in immediate contact with the articles in them; or the covers may be removed to admit the steam directly.

Having thus described my invention, I claim and desire to secure by Letters Patent of the United States—

1. In a steam cooking apparatus, the combination of the steam-chamber, having its sides and back folded or corrugated outward to form grooves or ways D, with the horizontal partitions E and H, the edges of which rest in and are clamped by the said grooves or ways, as and for the purpose shown and set forth.

2. In a steam cooking apparatus, the combination of the steam-chamber having its sides and back folded or corrugated outward at equal distances, forming ways or grooves D, and having drainage-apertures U in its sides, opening into the drainage-tubes T, with the horizontal partitions E and H, forming compartments for the reception of the several drawers and pans in which the articles to be cooked are contained, the edges of said partitions resting and being held firmly clamped in the grooves D, as and for the purpose shown and set forth.

3. In a steam cooking apparatus, the combination of the steam-chamber having its sides and back folded or corrugated outward at equal distances, forming grooves or ways D, and having drainage-apertures U in its sides, the vertical drainage-tubes T, fastened to the sides of the steam-chamber, and the horizontal partitions E and H, forming compartments for the reception of the several cooking-vessels, the edges of which partitions rest and are held fast in the grooves D, as and for the purpose shown and set forth.

In testimony that I claim the foregoing as my own I have hereunto affixed my signature in presence of two witnesses.

JOHN EDWARD WELLING.

Witnesses:
  S. S. WELLS,
  T. F. SHERRITT.